(12) United States Patent
Orofino, II et al.

(10) Patent No.: US 7,424,684 B2
(45) Date of Patent: Sep. 9, 2008

(54) FRAMES IN BLOCK DIAGRAM MODELING

(75) Inventors: Donald Paul Orofino, II, Sudbury, MA (US); Ramamurthy Mani, Needham, MA (US); Darel Allen Linebarger, Southborough, MA (US)

(73) Assignee: The MathWorks, Inc., Natick, MA (US)

( * ) Notice: Subject to any disclaimer, the term of this patent is extended or adjusted under 35 U.S.C. 154(b) by 848 days.

(21) Appl. No.: 10/414,441

(22) Filed: Apr. 15, 2003

(65) Prior Publication Data
US 2004/0208193 A1  Oct. 21, 2004

(51) Int. Cl.
*G06F 3/00* (2006.01)
(52) U.S. Cl. .................. 715/762; 715/782; 345/621; 703/13; 717/104
(58) Field of Classification Search .................. 715/762
See application file for complete search history.

(56) References Cited

U.S. PATENT DOCUMENTS

| | | | | |
|---|---|---|---|---|
| 4,637,402 | A | * | 1/1987 | Adelman ................ 600/559 |
| 5,301,301 | A | | 4/1994 | Kodosky et al. |
| 5,481,740 | A | | 1/1996 | Kodosky |
| 5,490,246 | A | | 2/1996 | Brotsky et al. |
| 5,572,657 | A | | 11/1996 | Pinedo et al. |
| 5,630,042 | A | * | 5/1997 | McIntosh et al. ............. 715/744 |
| 5,805,171 | A | | 9/1998 | St. Clair et al. |
| 5,933,637 | A | * | 8/1999 | Hurley et al. ............... 717/107 |
| 5,993,637 | A | | 11/1999 | Hisamatsu et al. |
| 6,123,589 | A | | 9/2000 | Andoh et al. |
| 6,182,278 | B1 | | 1/2001 | Hamada et al. |
| 6,278,456 | B1 | | 8/2001 | Wang et al. |
| 6,421,694 | B1 | | 7/2002 | Nawaz et al. |
| 6,701,513 | B1 | | 3/2004 | Bailey |
| 6,937,969 | B1 | | 8/2005 | Vandersteen et al. |
| 6,993,773 | B2 | | 1/2006 | Broussard |
| 7,047,495 | B1 | | 5/2006 | Pang et al. |
| 7,089,223 | B2 | | 8/2006 | Bartlett et al. |
| 2002/0183998 | A1 | | 12/2002 | Shakeri et al. |
| 2003/0016234 | A1 | * | 1/2003 | Mani et al. .................. 345/621 |
| 2003/0046663 | A1 | | 3/2003 | Rogers et al. |

(Continued)

FOREIGN PATENT DOCUMENTS

WO  WO-99/09473 A1  2/1999

OTHER PUBLICATIONS

Khurshudov, Andrei. The Essential Guide to Computer Data Storage: From Floppy to DVD. Prentice Hall. Jun. 7, 2001. Introduction, Digital and Analog Signals.*

(Continued)

*Primary Examiner*—David Wiley
*Assistant Examiner*—Ryan Pitaro
(74) *Attorney, Agent, or Firm*—Lahive & Cockfield, LLP; Kevin J. Canning (57) ABSTRACT

Methods and apparatus, including computer program products, for block diagram modeling, including generating a block diagram containing blocks interconnected by lines on a graphical user interface (GUI), specifying frame and channel information, the frame and channel information including a frame length, a number of channels, a frame category and an inter-sample spacing, and propagating the frame and channel information available at each of subsequent blocks in the block diagram.

23 Claims, 10 Drawing Sheets

U.S. PATENT DOCUMENTS

2004/0031019 A1  2/2004 Lamanna et al.

OTHER PUBLICATIONS

Demirkiran, I., Samarasooriya, V. N. S., Varshey, P. K., Weiner, D. D., Ramamurthy, Mani, Nawab, S. Hamid, and Tyler, Stephen. "Knowledge-Based Approach to Interference rejection for EMC." 1997. p. 1150-1155.*

Matlab News and Notes. Feb. 2000. p. 1-18.*

Cheneval, Y., et al., "Interactive DSP education using JAVA," *Acoustics, Speech and Signal Processing*, 1998. Proceedings of the 1998 IEEE International Conference on Seattle, WA, USA May 12-15, 1998, New York, NY, USA, found online at: http://www/andrew.cmu.edu/user/jelenak/Papers/98_05_ICASSP.doc.

Evans, B.L., et al., "Raising the level of abstraction: a signal processing system design course," *Proceedings of the IEEE Eurasip Workshop on Nonlinear Signal and Image Processing (NSIP'99)* Bogazici Univ. Instanbul, Turkey, found online at: http://www.ece.utexas.edu/~ bevans/papers/1999/embeddedSoftware/paper.ps.gz.

Hong, K.H., et al., "An integrated environment for rapid prototyping of DSP Algorithms using matlab and Texas instruments' TMS320C30," *Microprocessors and Microsystems*, found online at: http://md1.csa.com/partners/viewrecord.php?requester=gs&collection=TRD&recid=505076CI&q=Hong%2C+K.H.%2C+Integrated+environment+for+rapid+prototyping+of+DSP+algorithms+using+MATLAB+and+Texas+Instruments%27+TMS320C30&uid=787014619&setcookie=yes.

Demirkiran, I. et al., "A Knowledge-Based Interference Rejection Scheme for Direct Sequence Spread-Spectrum Systems," IEEE International Conference on Personal Wireless Communications, pp. 120-124 (1997).

Mani, Ramamurthy et al., "Integrated numeric and symbolic signal processing using a heterogeneous design environment," retrieved online at http://ptolemy.eecs.berkeley.edu/papers/96/ptolemyIPUS/spie96.pdf (1996).

Mascarin, Anne et al., "Frame Based Processing with the DSP Blockset," retrieved online at http://www.mathworks.com/company/newsletters/digest/march99/ (1999).

MathWorks, "DSP Blockset 2," http://web.ccr.jussieu.fr/ccr/Documentation/Calcul/matlab5v11/docs/00008/008e2.htm (1997).

Paredis, Christiaan J.J. et al., "Composable Models for Simulation-Based Design," retrieved online at http://www.srl.gatech.edu/publications/2001/cp.journ.EWC.2001.pdf (2001).

Vaupel-J. "Implicit and Explicit Services and their implementation through an Active Services Architecture" 1999 p. 417-427 INt ComputSci Inst, Berkeley, CA, as cited by examiner in U.S. Appl. No. 09/908,096.

International Search Report for PCT/US2005/045493, dated Apr. 25, 2007.

* cited by examiner

FRAMES IN BLOCK DIAGRAM MODELING

TECHNICAL FIELD

This application relates to frames in block diagram modeling.

BACKGROUND

Signal processing systems generally include a number of components that perform a series of signal operations and transformations to one or more input signals in order to obtain a set of desired output signals. In most real world applications, such signal processing systems are required to carry out the processing in real time to produce samples of the output signals as samples of the input signals become available. This processing can be carried out using sample-based processing or frame-based processing. In sample-based processing, each component acts upon one sample of its input signal every time it executes. In frame-based processing, each component acts upon a batch or "frame" of contiguous samples in its input signal every time it executes.

Frame-based processing has some advantages over sample-based processing. For example, frame-based processing decreases the number of times components execute in order to process a given number of samples. This reduction decreases the overhead involved in repeatedly executing components within the system both in software and hardware implementations of the overall system.

Also with frame-based processing there are a variety of signal operations and transformations that have more efficient algorithmic implementations when more than one sample is processed at each execution step of the algorithm. An example of such an operation is Finite Impulse Response (FIR) digital filtering which can be implemented either through a direct sample-based convolution or through the frame-based Overlap-Add (OLA) algorithm. For N samples of the input signal processed through an M-tap filter, the direct convolution approach has a computational complexity of $O(NM)$, while the OLA algorithm has a superior computational complexity of $O(N \log M)$.

Block-diagram modeling simplifies the process of conceptualizing, designing, simulating, and implementing (in software or hardware) custom signal processing systems. Block-diagram models are time-based relationships between signals and state variables representative of a dynamic system. The solution (computation of system response) of the model is obtained by evaluating these relationships over time, where time starts at a user-specified "start time" and ends at a user-specified "stop time". Each evaluation of these relationships is referred to as a time step. Signals represent quantities that change over time, and these quantities are defined for all points in time between the block-diagram's start and stop time. The relationships between signals and state variables are defined by sets of equations represented by blocks. These equations define a relationship between the input signals, output signals, and state variables. Inherent in the definition is the notion of parameters, which are the coefficients of the equations. The block-diagram modeling approach has spawned a variety of software products such as Simulink® that cater to various aspects of system analysis and design.

A signal is said to be sample-based when its value is represented by a single sample. Extending this notion, a signal is frame-based when its value is represented by a batch of multiple samples.

SUMMARY

In an aspect, the invention features a method including generating a block diagram containing blocks interconnected by lines on a graphical user interface (GUI), specifying frame and channel information at source blocks and blocks with buffering or related changes to a sample rate and/or a frame size, and propagating the frame and channel information available at each of the blocks in the block diagram.

One or more of the following advantageous features can also be included. The method can include displaying the frame and channel information on a GUI. The frame and channel information can include a frame length, a number of channels, a frame category, and an inter-sample spacing.

In embodiments, the frame category can be contiguous frames. Contiguous frames can represent samples in one frame being contiguous with previous and next frames. The inter-sample spacing for contiguous frames can be computed as $\Delta s = Tf/F$, where F represents the frame length and Tf represents a rate at which new frames are produced.

The frame category can be discontiguous frames. Discontiguous frames can represent samples in one frame that are not contiguous or adjacent to samples in the next and previous frames. The inter-sampling spacing for discontiguous frames can represented as $\Delta s$ for uniform discontiguous frames. The inter-sampling spacing for discontigous frames can be represented by a spacing function $f_\Delta(i)$ with each frame for non-uniform discontigous frames. Discontiguous frames can be represented on the GUI as 2-lined arrows with periodic vertical separation lines.

In another aspect, the invention features a block diagram modeling method including generating a block diagram containing blocks interconnected by lines on a graphical user interface (GUI), specifying frame and channel information, the frame and channel information including a frame length, a number of channels, a frame category and an inter-sample spacing, and propagating the frame and channel information available at each of subsequent blocks in the block diagram.

One or more of the following advantageous features can also be included. The method can include displaying the frame and channel information on a GUI.

In embodiments, the frame category can be contiguous frames. Contiguous frames can represent samples in one frame being contiguous with previous and next frames. The inter-sample spacing for contiguous frames can be computed as $\Delta s = Tf/F$, where F represents the frame length and Tf represents a rate at which new frames are produced.

The frame category can be discontiguous frames. Discontiguous frames can represent samples in one frame that are not contiguous or adjacent to samples in the next and previous frames. The inter-sampling spacing for discontiguous frames can represented as $\Delta s$ for uniform discontiguous frames. The inter-sampling spacing for discontigous frames can be represented by a spacing function $f_\Delta(i)$ with each frame for non-uniform discontigous frames. Discontiguous frames can be represented on the GUI as 2-lined arrows with periodic vertical separation lines.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
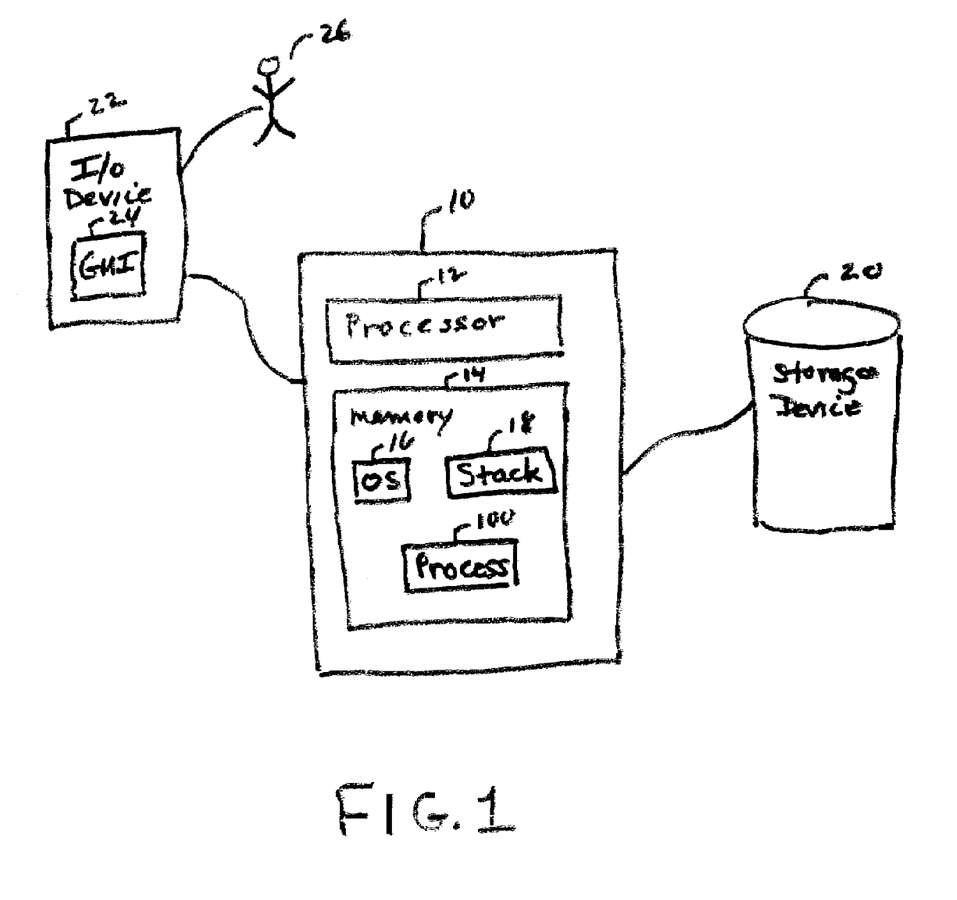
FIG. 1 is a block diagram of a system.

In FIG. 1, a modeling system 10 includes a processor 12 and a memory 14. Memory 14 stores an operating system (OS) 16 such as Linux or Windows XP, a TCP/IP protocol stack 18 for communicating over a network (not shown), and a block diagram modeling process 100. System 10 also includes a storage device 20 and an input/output (I/O) device 22. I/O device 22 can include a graphical user interface (GUI) 24 for display to a user 26.

In the past, block-diagram processes have offered some measure of frame-based processing support. Such previous frame-based support, unlike process 100, suffers from some limiting restrictions that fall generally into three categories.

In a first category, referred to herein as F-I, there is an ability to toggle frame-processing for the entire block-diagram. In this approach, users have the option to specify whether or not the blocks in the block diagram are operating in frame-based or sample-based mode. When operating in frame-based mode, users have the ability to specify the number of samples in each frame of signal values.

In a second category, referred to herein as F-II, there is an ability to toggle frame-processing for each block in a block diagram. In this approach, users have the ability to specify whether or not each block is operating in frame-based mode. In addition, users would specify the size of the frame at each block. This approach allows users to build heterogeneous systems that have sub-components with both frame- and sample-based characteristics. But this approach does have a drawback in that it is fairly cumbersome and error-prone because the user is forced to enter redundant frame information at each block.

A third category, referred to herein as F-III or implicit frame-based processing, overcomes the drawbacks of the two frame-based processing approaches F-I and F-II described above through high-level mechanisms discussed below.

Figure 2:
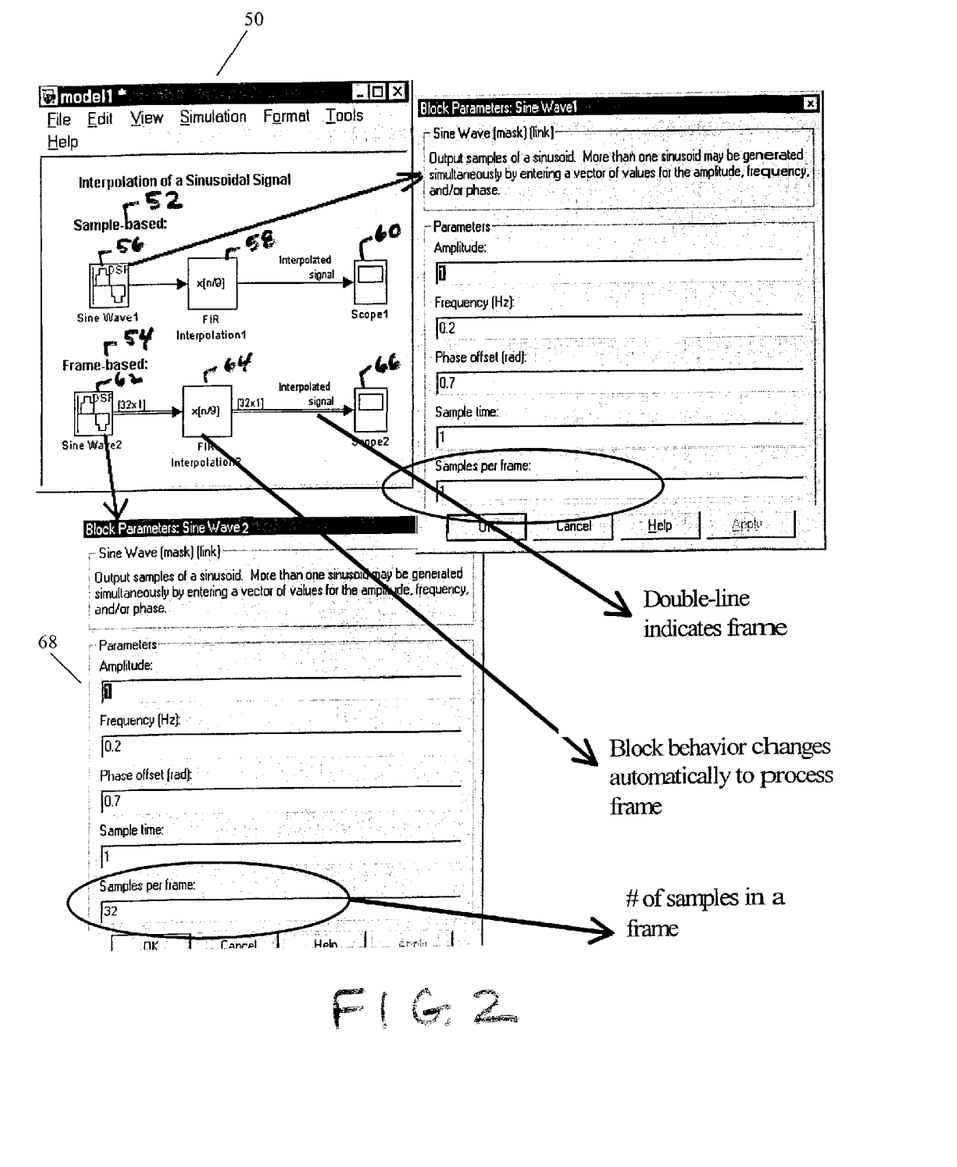
FIG. 2 is a block diagram of a graphical user interface (GUI).

In FIG. 2, a GUI 50 includes a block diagram 51 that has a sample-based section 52 and a frame-based section 54. Section 52 includes a sine block 56, an FIR interpolation block 58 and a scope block 60. Section 54 includes a sine block 62, an FIR interpolation block 64 and a scope block 66. In contrast to the approach F-II, users specify frame attribute information in only one of two categories of blocks, i.e., source blocks and/or blocks with buffering or related changes to the sample rate and/or frame size. Source blocks are blocks that have no input signals and generate a signal whose values are a function of time. Users can specify how many samples the source should accumulate in a buffer before generating a frame of signal values. When the source executes, it generates an output signal that is made up of a frame of signal values. Blocks, other than a source, such as a buffer, can also produce a frame-based signal as a function of their input signals when they execute. Other blocks can make changes to the sample rate or frame size of a signal, and such changes can influence frame attributes.

In the case of frame-based interpolation (e.g., section 54), the frame information is specified only with the parameters of the source sine wave block 62. Note that in the parameters dialog GUI 68 of the sine wave block 62 there are thirty-two samples per frame. This implies that the sine wave block 62 will generate a signal that includes a frame of thirty-two samples whenever it executes. At a time of execution (also referred to as "run-time" in this document) of the block diagram, the process 100, such as Simulink® from The Mathworks of Natick, Mass., propagates frame information from the blocks on which the user specified this information to all other blocks in the block diagram. This is in direct contrast to both approaches F-I and F-II in which users specify frame attributes prior to run-time.

The propagation mechanism is responsible for sending frame information from blocks that explicitly contain frame information (such as sources and buffers) to other blocks that do not have explicit frame information in the block diagram. The frame information includes: (1) one bit of information specifying whether or not from the signal connecting one block to another is sample- or frame-based, and (2) the size of the frame in number of samples (M), which we chose to represent as a [M×1] vector.

In sections 52, 54 the frame attributes are propagated automatically from the sine wave blocks 56, 62 to the FIR interpolation blocks 58, 64 and scope blocks 60, 66. Therefore, the frame information needs to be specified only in sine wave blocks 56, 62. The remaining blocks automatically obtain the frame attribute information through propagation.

An important benefit of this approach can be understood by considering two different sets of users who use block-diagram processes such as Simulink®. Secondary users are users responsible for implementing custom blocks that correspond to various signal-processing operations. Tertiary users are users that build block-diagrams that implement their custom signal processing systems. The propagation of frame information automatically facilitates the following.

Secondary users can package both sample- and frame-based implementations of an operation in a single block. At run-time, such a block can use the appropriate implementation once the frame attributes of all signals are known. This dynamic choice of implementation at run-time is analogous to the polymorphism exhibited by programming languages such as C++ and Java®.

Tertiary users can use the same block in both sample- and frame-based contexts without specifying the exact context a-priori. This contributes to the ease-of-use of the software package. Furthermore, these users can also easily switch between sample- and frame-based implementations of their system by manipulating only the blocks that impact the sample rate and/or frame size. This is illustrated in FIG. 2 where users need to specify frame information only at the source sine wave blocks. The remaining blocks that are connected to these sources automatically adapt to sample- or frame-based behaviors.

Figure 3:
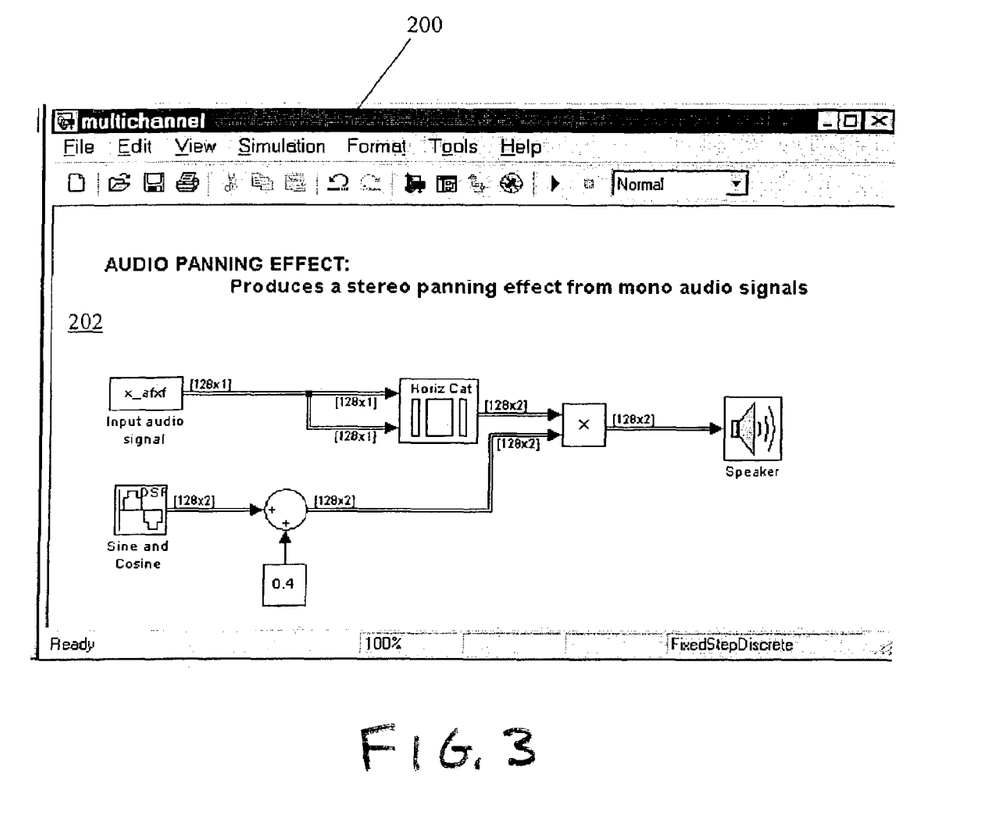
FIG. 3 is a block diagram illustrating a concept of contiguous and discontiguous frames.

In FIG. 3, a GUI 200 illustrates multi-channel frame-based processing. In a variety of signal processing domains a signal is segregated into multiple channels (e.g., two-channel stereo signals in the audio domain, N-channel signals in radar and sonar domain). Furthermore, in these domains the multi-channel signals are processed as a single atomic signal through an application system (e.g. a compression system for audio signals).

As described above with reference to tertiary users, the propagation mechanism for frame-based processing is responsible for sending two pieces of information from one block to another. Multi-channel processing is achieved in process 100 by extending this mechanism to carry one more piece of information: the number of channels (N). To obtain conciseness of representation, we combine the frame and channel size information into the representation [M×N].

A block diagram 202 simulates the audio special-effect of stereo panning. We see in this block diagram 202 how one 128-sample 204 frame of mono audio signal is converted to stereo audio signal with 128 samples per channel.

For heterogeneous simulations, the approach uses the notion of visual cues that help partition the block-diagram into sample- and frame-based sub-components. Such cues are necessary for users to be able to quickly assimilate the most information from looking at a graphical representation of the block diagram. A first cue involves drawing the lines connecting blocks in two different formats. For lines that represent sample-based signals interconnecting one block to another, a single line is used. For lines that represent the frame-based signals interconnecting one block to another, a double line is used. In a second cue, the size of the frame (M) and the number of channels (N) are also shown on each line in the format [M×N].

Process 100 extends the implicit frame-based processing approach discussed previously. For example, process 100 categorizes frames as contiguous and discontiguous. In approach F-III above, each frame was considered to be simply a batch of sequential signal samples. In process 100, we introduce the following categorization of frames based on the relationship of samples contained in one frame to samples contained in a next frame.

Contiguous frames: the values of a frame-based signal are made up of contiguous frames when the samples in one frame are contiguous in time to the samples in the previous and next frames.

Discontiguous frames: the values of a frame-based signal are made up of discontiguous frames when the samples in one frame are not contiguous or adjacent in time to the samples in the previous and next frames. Such frames are generated either when there is an overlap or a gap in the samples from one frame to the next or when the samples from one frame to the next are independent and have no sequential relationship between them. The latter is common when the frames correspond to a signal that is produced by a block that is transforming its input signal to another domain such as the frequency or cepstral domain.

Figure 4:
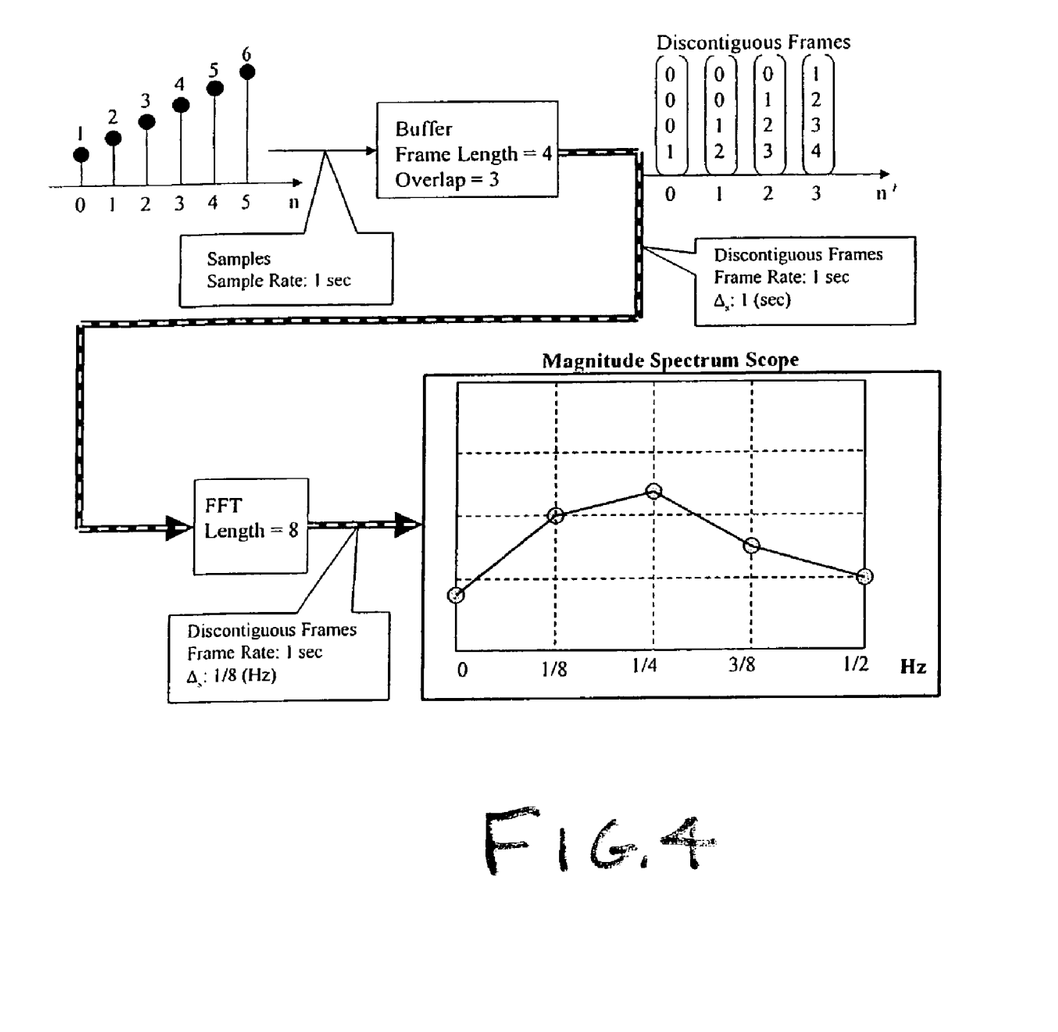
FIG. 4 is a block diagram showing contiguous frames as one contiguous signal.

The categorization of frames as contiguous or discontiguous is useful, for example, in two different instances. In signal visualization and logging, if it is known that a frame is contiguous, viewers can plot the values in a signal seamlessly from one frame to the next. Signals can also be logged over time for later analysis in a sequential manner. This is illustrated in FIG. 4, where the scope plots signals including contiguous frames. Conversely, for the case of discontiguous frames, viewers can be specially equipped to refresh the displayed information over time as each new frame of signal values becomes available.

Figure 5:
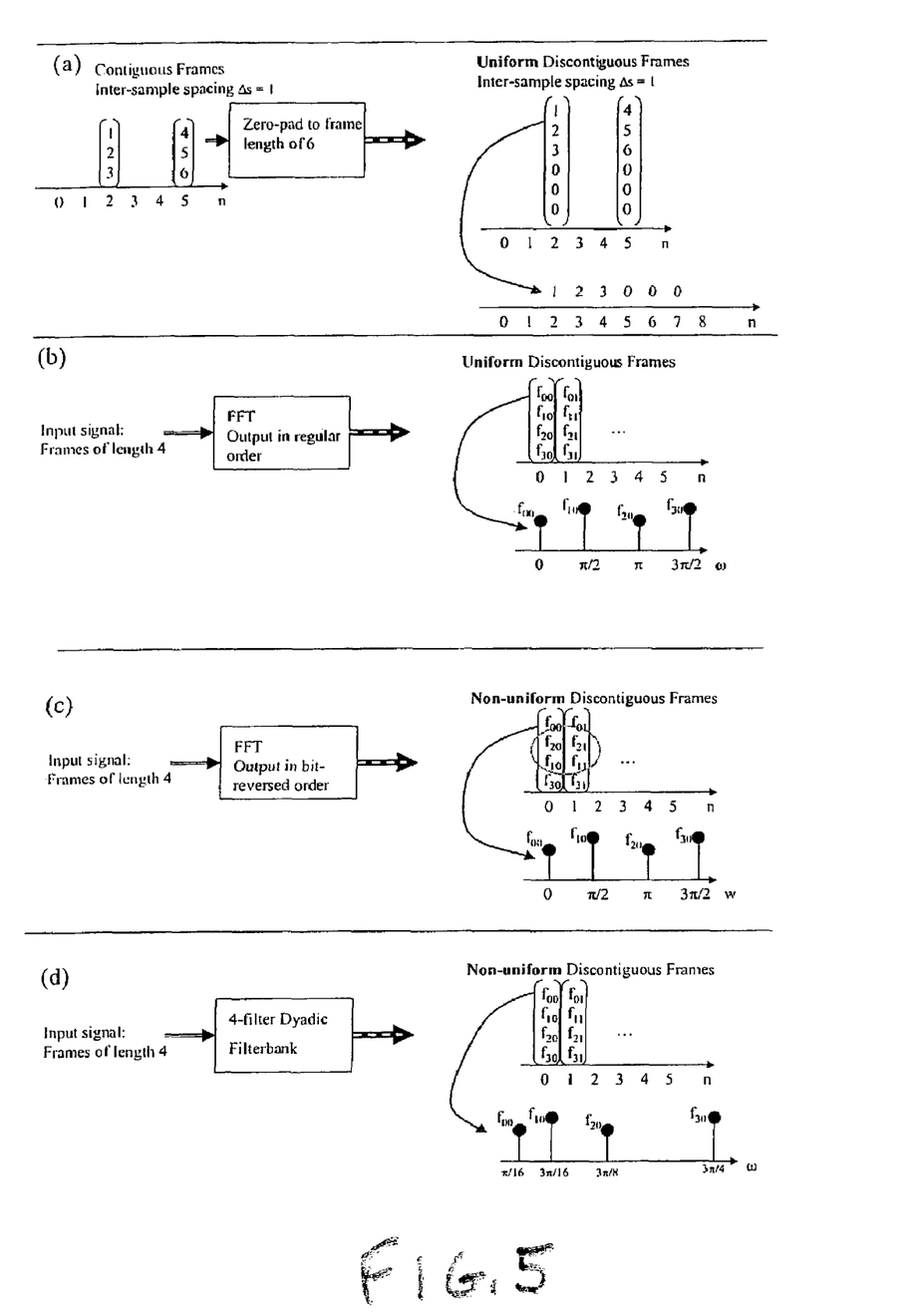
FIG. 5 is a block diagram showing polymorphism based on a type of input frame.

In block polymorphism, by knowing whether an input signal frame is contiguous or discontiguous, blocks can automatically modify their behaviors. For example, let us consider the case of a unit-delay block. A unit delay block delays its input by a specified sample period. The unit delay block accepts one input and generates one output, which can be either both scalar or both vector. The block can automatically alter its behavior to be a sample delay or a full-frame delay as illustrated in FIG. 5, depending on whether the input frame is contiguous or discontiguous. Yet another example of such polymorphism is found by considering a discrete filter block. The discrete filter block represents a method often used by signal processing engineers who describe digital filters using polynomials in $z^{-1}$ (the delay operator). If the input to this filter block is a contiguous frame, the filter would retain its state as it processes successive frames of its input signal. For the case of discontiguous frame inputs, the filter would reset its state to the initial conditions as it processes successive frames of its input signal because there is no expressible relationship between two consecutive frames.

Process 100 associates an inter-sample time spacing Δs with each frame. For the case of contiguous frames, we do not need to explicitly capture the spacing between two samples. This is because given the length of each frame (F) and the period at which new frames are produced (Tf), the inter-sample spacing can be computed as: Δs=Tf/F.

Figure 6:
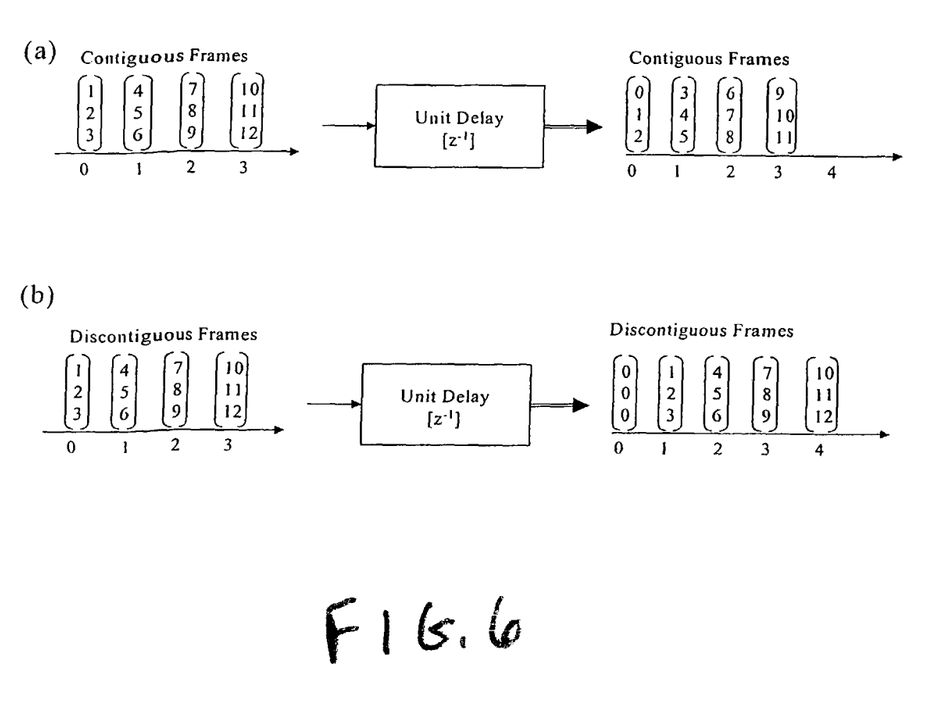
FIG. 6 is a block diagram showing a concept of discontiguous uniform and non-uniform frames.

For discontiguous frames, we explicitly associate inter-sample spacing information with each frame. This information can be in one of two forms based on whether or not the samples within a discontiguous frame are uniformly spaced. With uniform discontiguous frames, the samples within a frame are spaced equally apart. For such frames, we only store a single number Δs that is the inter-sample spacing, as shown in FIG. 6. With non-uniform discontiguous frames, these are frames in which the samples within a frame are not spaced equally apart. For such frames, we associate a spacing function $f_A(i)$ with each frame. Given the index 'i' of an element in the frame, $f_A(i)$ gives the separation from the previous sample with index 'i-1'. Alternatively, we record that the samples are non-uniformly spaced and that no other information pertaining to Δs is available.

Figure 7:
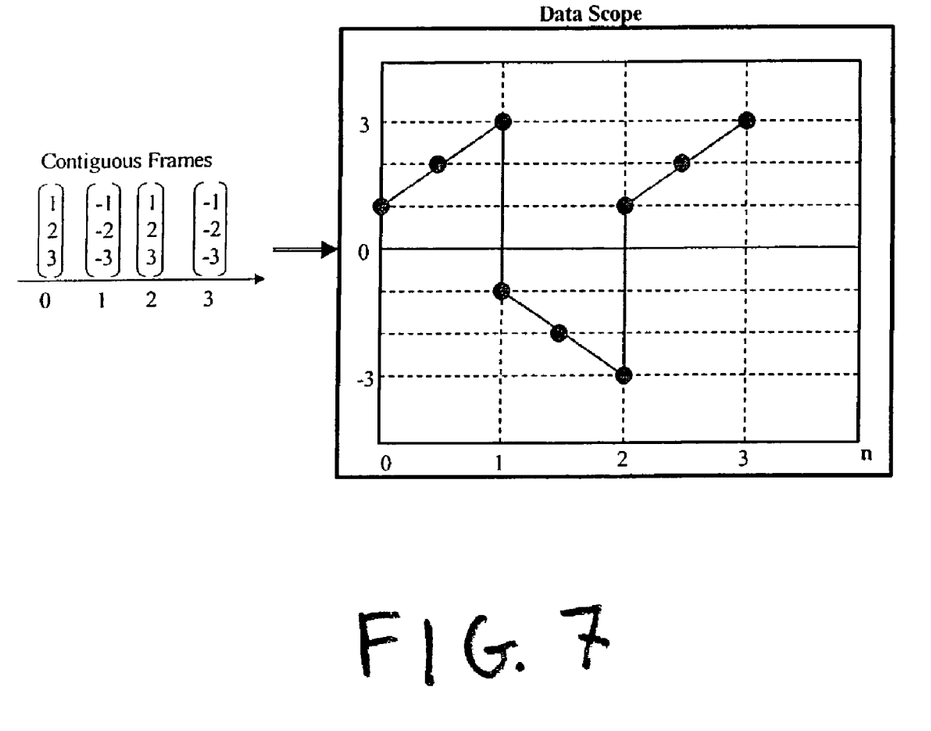
FIG. 7 is a block diagram showing how better visualization is facilitated by the use of inter-sample spacing in discontiguous frames.

Capturing the inter-sample spacing explicitly with each discontiguous frame results in some advantages. In FIG. 7, signal visualization and logging is improved. Note that the correct spacing on the x-axis of the frequency plot was made possible only through the use of Δs. Note that this example can also be easily extended to the case of non-uniform discontiguous frames such as those produced by a non-uniformly spaced filter bank.

Explicit specification of inter-sample spacing allows blocks that take multiple frame input signals to enforce alignment between input signal values. For instance, let us consider a 'Sum' block that can add two frame-based input signals. This block could automatically produce an error when the inter-sample spacing is not equal for the two signals that are being added. Allowing the enforcement of such alignment restrictions provides a cleaner modeling environment for large applications.

Approach F-III, described above, introduced the automatic propagation of frame information from one block to another in the block-diagram. This allowed minimal specification of the frame information within source blocks and blocks that make changes or specify the sample rate and/or frame size. In process 100 we extend the propagated frame information to include the frame category (contiguous or discontiguous) and the inter-sample spacing Δs (or $f_A(s)$) for discontiguous frames. Such a propagation mechanism enables us to gain advantages such as block polymorphism, signal visualization, and enforcement of data alignment.

Process 100 includes generating a marked block-diagram to distinguish between contiguous frames and non-contiguous frame-based signals. For example, we use 2-lined arrows with periodic vertical separation lines to indicate discontiguous frames. Such marking allows users to visually partition the diagram into various regions operating on different frame formats. We also explicitly annotate the lines with callouts to indicate the inter-sample spacing within the frames.

Process 100 receives as inputs a block-diagram containing blocks interconnected by lines, and frame and channel information specified at source blocks, blocks with buffering and blocks that make changes or specify the sample rate and/or frame size. Process 100 outputs frame and channel information available at each of the blocks in the block diagram, and representations of frame information on the GUI.

At each port of a block in the block-diagram, the frame and channel information are represented using the following attributes: frame length, number of channels, frame category and inter-sample spacing. An example of a data-structure (in C) that can be used to capture the above information is:

```
typedef enum {
        CONTIGUOUS_FRAME,
        DISCONTINUOUS_FRAME
} FrameType;
typedef enum {
UNIFORM_SPACING,
NON_UNIFORM_SPACING
} SpacingType;
typedef double (*SpacingFcn) (int);
typedef struct {
        int frameLen;
        int numChannels;
        FrameType fType;
        SpacingType sType;
        union {
    double delta_s;
    SpacingFcn delta_s_fcn_ptr;
        }
} FrameInfo;
```

The frame information is generally fully specified at the ports of source blocks and blocks that make changes or specify the sample rate and/or frame size. The propagation mechanism then ensures that this information is automatically propagated to the ports of the remaining blocks in the block-diagram. The components of this propagation mechanism are described below.

Process 100 includes a frame propagation sub-process 102. Sub-process 102 includes an outer loop stage 104 and an inner loop stage 106. The outer loop stage 104 represents an overall processing loop that is responsible for sending frame and channel information from a source block to all blocks connected directly or indirectly to it.

Figure 8:
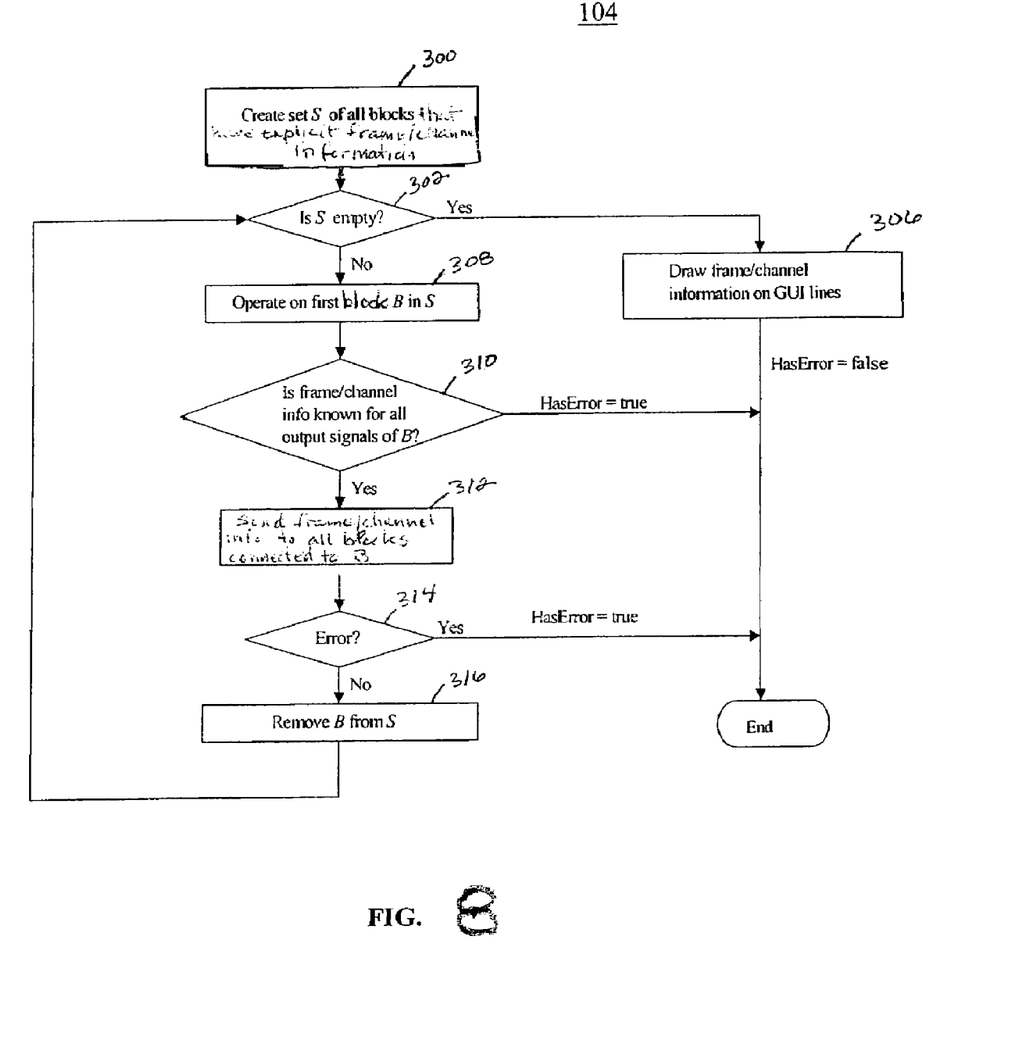
FIG. 8 is a flow chart.

In FIG. 8, outer loop stage 104 includes generating (300) a set S of all blocks that make changes or specify frame information such as the sample rate and frame size. Stage 104 determines (302) whether set S is empty. If set S is empty, stage 104 draws (306) frame/channel information on GUI lines and terminates.

If set S is not empty stage 102 operates (308) on the first block B in set S. Stage 102 determines (310) whether frame/channel information is known for all output signals of B. If known, stage 102 terminates. If not known, stage 102 sends frame/channel information to all blocks connected to B (312). If stage 102 determines (314) an error it terminates. If no error is determined (314), stage 102 removes (316) B from S and determines (302) whether set S is empty.

Figure 9:
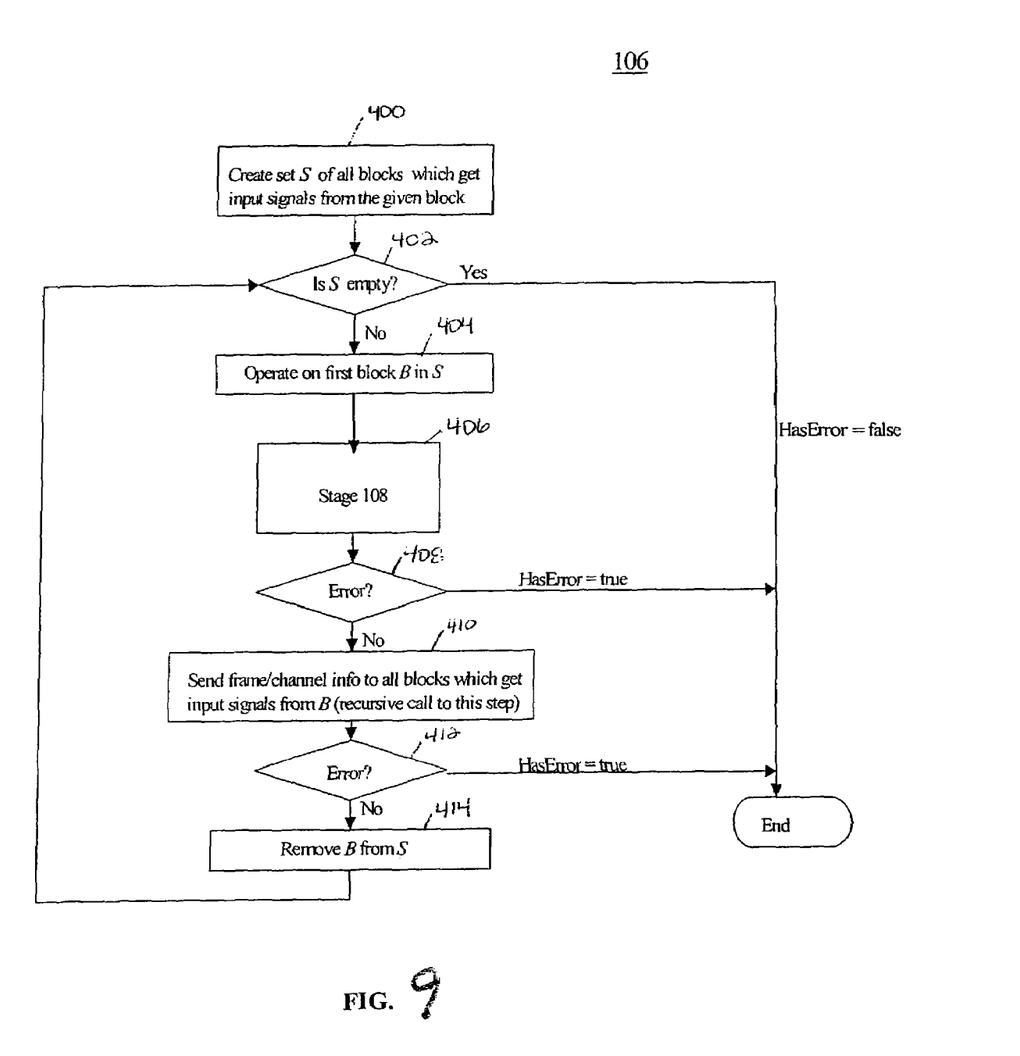
FIG. 9 is a flow chart.

In FIG. 9, inner loop stage 106 includes generating (400) set S of all blocks that get input signals from the given block. Stage 106 determines (402) whether set S is empty and if so, terminates. If set S is not empty, stage 106 operates (404) on the first block B in set S. Stage 106 executes (406) stage 108 by sending frame/channel information from given block to B. Block B uses this information for its output signals. Stage 106 determines (408) whether an error occurs and if so, terminates. If no error is determined (408) stage 106 sends (410) frame/channel information to all blocks that get input signals from B (i.e., a recursive call). If stage 106 determines (412) an error it terminates. If no error is determined (412), stage 106 removes (414) B from S and determines (402) whether set S is empty.

Figure 10:
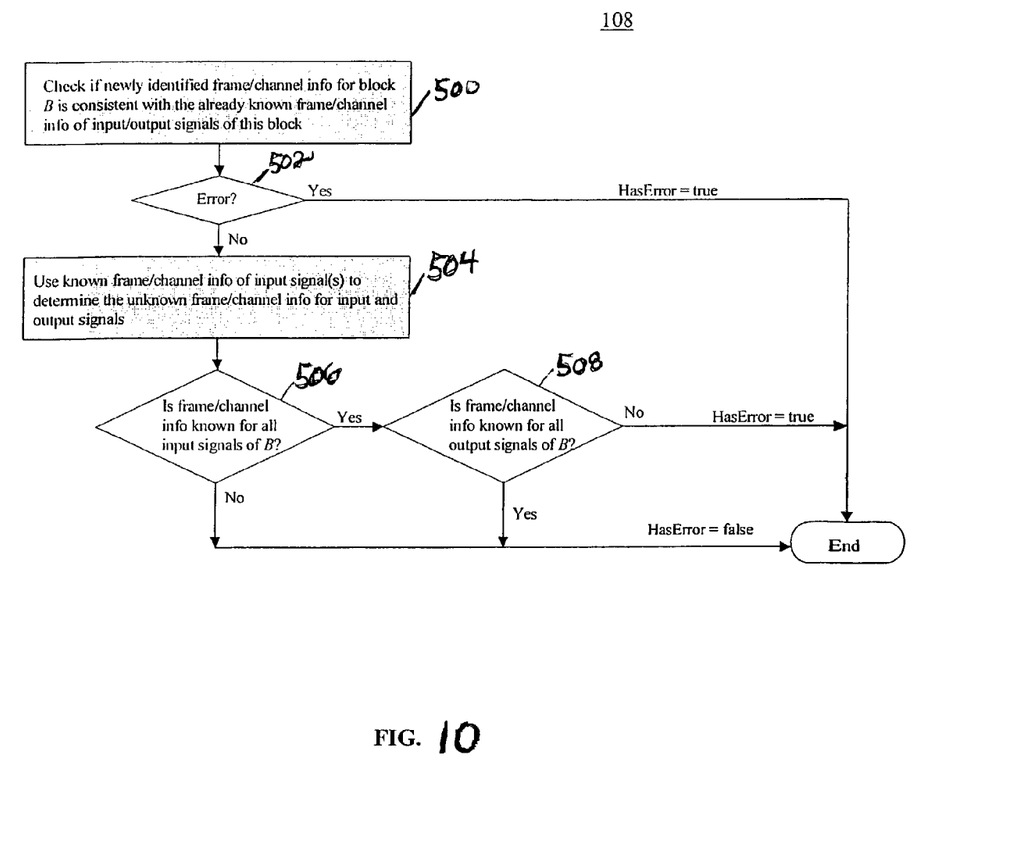
FIG. 10 is a flow chart.

In FIG. 10, stage 108 includes checking (500) if newly identified frame/channel information for block B is consistent with the already known frame/channel information of input/output signals of this block. If an error is determined (502) stage 108 terminates. If no error occurs stage 108 uses (504) known frame/channel information of input signal(s) to determine the unknown frame/channel information for input and output signals. If stage 108 determines (506) frame/channel information is not known for all input signals of B stage 108 sets an error flag and terminates. If stage 108 determines (508) that frame/channel information is known for all output signals stage 108 clears the error flag and terminates.

Stages 104, 106, 108 involve using rules to determine output frame and channel information on the basis of input frame and channel information. A few examples of such rules follow. For example, buffer block takes a sample-based signal and converts it to a frame-based signal of specified frame size. This block would enforce the restriction that the input be a sample-based signal. It will then output a frame-based signal of the specified frame size. The frame category is set to be contiguous if there is no overlap or gap between adjacent frames. The category is set to discontiguous if there are overlaps or gaps. The inter-sample spacing is set appropriately.

In another example, an upsampler block which takes a sample- or frame-based signal and upsamples it by an integer factor enforces the following restrictions: (1) if the input is sample-based, then the output is also sample-based; (2) if the input is frame-based, then the output is frame-based; (3) the input frame category has to be contiguous; (4) the input and output signals have the same channel size; (5) the output frame size is the input frame size multiplied by the upsampling factor; (6) the output inter-sample spacing for frame-based signals is ½ the spacing of the input.

To prevent secondary users (who implement custom blocks) from having to implement these rules for each of their blocks, we also provide them with built-in default rules:

1. For blocks with one input signal and one output signal, we assume that the input and output signals have identical frame and channel attributes.
2. For blocks with multiple input signals and one output signal, we implement one of the following cases:
    (a) If all inputs are sample-based, then the output is sample-based.
    (b) If all inputs are frame-based and of the same frame category and identical inter-sample spacing, then the output is frame-based with the same category and inter-sample spacing as any one of the inputs. Furthermore, all inputs and the output are constrained to have the frame and channel sizes.
    (c) If some inputs are sample-based and some are frame-based (with the same frame category and inter-sample spacing), then the output is set to be frame-based with frame category and inter-sample spacing set to be identical to one of the frame-based inputs. Furthermore, all frame-based inputs and the output are constrained to have the same size for the frame and channel attribute.

(d) All other combinations result in an error. Note that if users want specialized behaviors, they do not have to rely on this default rule and can build custom propagation rules into their own blocks.

3. For all other blocks which do not explicitly specify their rules for processing frame/channel information, we error out.

The invention can be implemented in digital electronic circuitry, or in computer hardware, firmware, software, or in combinations of them.

The invention can be implemented as a computer program product, i.e., a computer program tangibly embodied in an information carrier, e.g., in a machine-readable storage device for execution by, or to control the operation of, data processing apparatus, e.g., a programmable processor, a computer, or multiiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
    generating a block diagram containing blocks interconnected by lines on a graphical user interface (GUI);
    specifying frame and channel information at source blocks and blocks with buffering or related changes to a sample rate and/or a frame size, the frame and channel information comprising information that identifies whether the frames are contiguous or discontiguous,
        contiguous frames representing samples in one frame being contiguous or adjacent in time to samples in a previous frame or a next frame, and
        discontiguous frames representing samples in one frame that are not contiguous or adjacent in time to samples in a previous frame or a next frame, the discontiguous frames being identified in the frame and channel information as uniform or non-uniform depending on a spacing between samples within each discontiguous frame; and
    propagating the frame and channel information available at each of the blocks in the block diagram.

2. The method of claim 1 further comprising displaying the frame and channel information on a GUI.

3. The method of claim 1 which the frame and channel information further comprises:
    a frame length; and
    a number of channels.

4. The method of claim 1 in which the inter-sample spacing for contiguous frames is computed as $\Delta s=Tf/F$, where F represents the frame length and Tf represents a period at which new frames are produced.

5. The method of claim 1 in which the inter-sampling spacing for uniform discontiguous frames is computed as $\Delta s=Tf/F$, where F represents the frame length and Tf represents a period at which new frames are produced.

6. The method of claim 1 in which the inter-sampling spacing for non-uniform discontiguous frames is represented by a spacing function $f_A(i)$ with each frame.

7. The method of claim 2 in which discontiguous frames are represented on the GUI as 2-lined arrows with periodic vertical separation lines.

8. A block diagram modeling method comprising:
    generating a block diagram containing blocks interconnected by lines on a graphical user interface (GUI);
    specifying frame and channel information, the frame and channel information including a frame length, a number of channels and a frame category identified as contiguous or discontiguous,
        contiguous frames representing samples in one frame being contiguous or adjacent in time to samples in a previous frame or a next frame, and
        discontiguous frames representing samples in one frame that are not contiguous or adjacent in time to samples in a previous frame or a next frame, the discontiguous frames being identified in the frame and channel information as uniform or non-uniform depending on a spacing between samples within each discontiguous frame; and
    propagating the frame and channel information available at each of subsequent blocks in the block diagram.

9. The method of claim 8 further comprising displaying the frame and channel information on a GUI.

10. The method of claim 8 which the inter-sample spacing for contiguous frames is computed as $\Delta s=Tf/F$, where F represents the frame length and Tf represents a period at which new frames are produced.

11. The method of claim 8 in which the inter-sampling spacing for uniform discontiguous frames is computed as $\Delta s=Tf/F$, where F represents the frame length and Tf represents a period at which new frames are produced.

12. The method of claim 8 in which the inter-sampling spacing for non-uniform discontiguous frames is represented by a spacing function $f_A(i)$ with each frame.

13. The method of claim 8 which discontiguous frames are represented on the GUI as 2-lined arrows with periodic vertical separation lines.

14. A computer program product holding processor executable instructions for performing a method, the method comprising:

Generating a block diagram containing blocks interconnected by lines on a graphical user interface (GUI); Specifying frame and channel information at source blocks and blocks with buffering or related changes to a sample rate or a frame size, the frame and channel information comprising information that identifies whether the frames are contiguous or discontiguous, contiguous frames representing samples in one flame being contiguous or adjacent in time to samples in a previous flame or a next frame, and discontiguous frames representing samples in one flame that are not contiguous or adjacent in time to samples in a previous flame or a next frame, the discontiguous frames being identified in the flame and channel information as uniform or non-uniform depending on a spacing between samples within each discontiguous frame; and propagating the frame and channel information available at each of the blocks in the block diagram.

15. The computer program product of claim 14 in which the frame and channel information comprises:

a frame length; and a number of channels.

16. A system for modeling dynamic systems, the system comprising:

an interface for constructing a block diagram model of a dynamic system;

an interface for specifying frame and channel information at source blocks and blocks with buffering or related changes to a sample rate and/or a frame size in the block diagram, the frame and channel information comprising information that identifies the frames as contiguous or discontiguous, contiguous frames representing samples in one frame being contiguous or adjacent in time to samples in a previous frame or a next frame, and discontiguous frames representing samples in one frame that are not contiguous or adjacent in time to samples in a previous frame or a next frame, the discontiguous frames being identified in the frame and channel information as uniform or non-uniform depending on a spacing between samples within each discontiguous frame; and a propagation mechanism for propagating the frame and channel information available at each of the blocks in the block diagram.

17. the system of claim 16 wherein the modeling interface uses a Graphical user interface (GUI).

18. the system of claim 16 wherein the interface for specifying frame and channel information is a graphical user interface (GUI).

19. The system of claim 16 in which the frame and channel information comprises:

a frame length; and a number of channels.

20. The method of claim 1 in which an inter-sample time spacing is associated with each frame.

21. The method of claim 8 in which an inter-sample time spacing is associated with each frame.

22. The medium of claim 14 in which an inter-sample time spacing is associated with each frame.

23. The system of claim 16 in which an inter-sample time spacing is associated with each frame.

* * * * *

UNITED STATES PATENT AND TRADEMARK OFFICE
CERTIFICATE OF CORRECTION

| | | |
|---|---|---|
| PATENT NO. | : 7,424,684 B2 | |
| APPLICATION NO. | : 10/414441 | |
| DATED | : September 9, 2008 | |
| INVENTOR(S) | : Donald Paul Orofino, II et al. | |

It is certified that error appears in the above-identified patent and that said Letters Patent is hereby corrected as shown below:

At column 2, line 17/18, please change "The Math-works" to --The Math-Works, Inc.--

At column 2, line 31, please change "discontigous" to --discontiguous--

At column 2, line 58, please change "discontigous" to --discontiguous--

At column 2, line 60, please change "discontigous" to --discontiguous--

At column 5, line 3, please change "e.g." to --e.g.,--

At column 7, line 23, please change "DISCONTINUOUS" to --DISCONTIGUOUS--

At column 11, line 14 (Claim), please change "flame" to --frame--

At column 11, line 15 (Claim), please change "flame" to --frame--

At column 11, line 17 (Claim), please change "flame" to --frame--

At column 11, line 18 (Claim), please change "flame" to --frame--

At column 11, line 18 (Claim), please change "flame" to --frame--

Signed and Sealed this

Sixth Day of January, 2009

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,424,684 B2 | Page 1 of 1 |
| APPLICATION NO. | : 10/414441 | |
| DATED | : September 9, 2008 | |
| INVENTOR(S) | : Donald Paul Orofino, II et al. | |

It is certified that error appears in the above-identified patent and that said Letters Patent is hereby corrected as shown below:

At column 2, line 28, of the printed patent, please add "be" after --can--

At column 2, line 57, of the printed patent, please add "be" after --can--

Signed and Sealed this

Twenty-seventh Day of January, 2009

JOHN DOLL
*Acting Director of the United States Patent and Trademark Office*